June 10, 1958    R. GOUIRAND    2,838,321
PNEUMATIC SUSPENSION FOR VEHICLES
Original Filed May 19, 1948
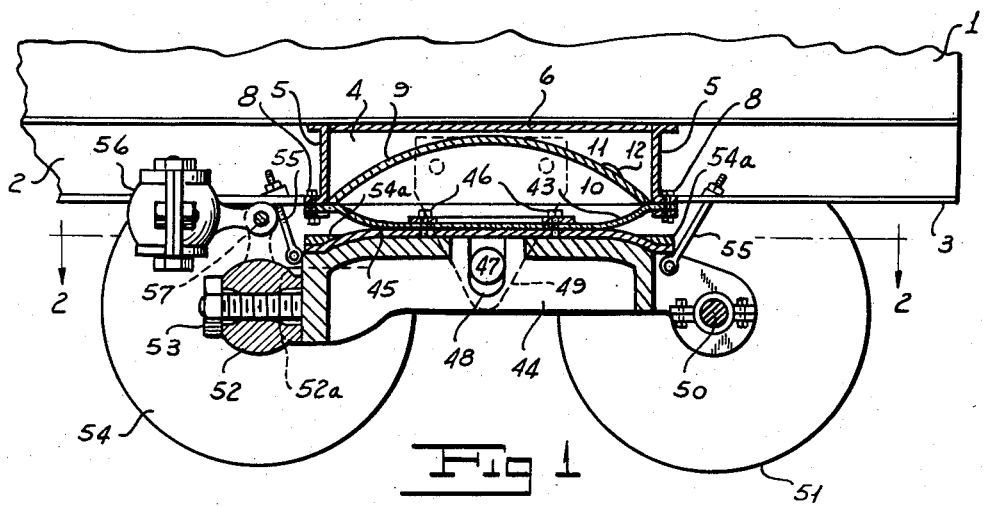
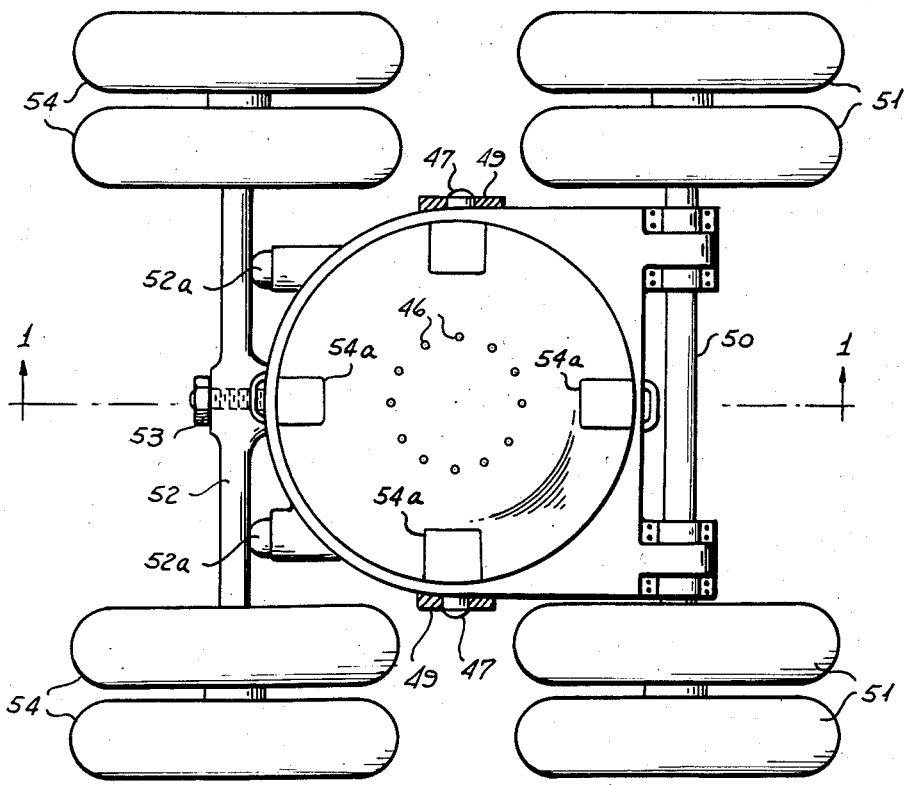
INVENTOR.
RENE GOUIRAND
BY
ATTORNEY

2,838,321

PNEUMATIC SUSPENSION FOR VEHICLES

Rene Gouirand, New York, N. Y.

Original application May 19, 1948, Serial No. 27,966, now Patent No. 2,663,569, dated December 22, 1953. Divided and this application November 17, 1953, Serial No. 392,656

9 Claims. (Cl. 280—104.5)

This invention is a division of my copending application, Serial No. 27,966, filed May 19, 1948, on "Pneumatic Suspension for Vehicles," which matured into Patent No. 2,663,569, dated December 22, 1953.

This invention relates to pneumatic suspensions for vehicles, such as automobiles, trucks, trailers and the like, although certain of the constructions herein disclosed may be used to advantage on railway cars.

The primary object of the invention is to provide relatively simple, economical constructions adapted to support both light and heavy loads through the employment of pneumatic devices wherein the pressures employed may be effectually controlled in accordance with the load.

These objects, and others, are obtained through the use of the novel constructions hereinafter more particularly described and claimed.

The accompanying drawings illustrate one practical embodiment of the invention, but the construction therein shown is to be understood as illustrative, only, and not as defining the limits of the invention.

Fig. 1 shows a vertical section of a suspension embodying my invention, said section being taken substantially in the plane of the line 1—1 of Fig. 2.

Fig. 2 is a section taken in the plane of the line 2—2 of Fig. 1.

Referring to the drawings, 1 designates the body of the vehicle which is supported on a chassis frame 2 here shown as comprising two longitudinal frame members 3 of the channel cross section. Built into the rear portion of the chassis frame is a pneumatic chamber 4, closed on its front and back by plates 5 which extend between the side members 3 of the frame to form the end walls of the chamber. The top of the chamber is closed by a plate 6 and the bottom of the chamber is closed by a diaphragm 43 firmly secured in place by means of bolts 8, so that the chamber 4 is normally heremetically sealed. I preferably divide this chamber 4 by means of a rigid arcuate partition 9 into two sections 10 and 11 and in this partition 9 I provide a check valve 12 adapted to freely open to permit pressure to pass from the section 10 into the section 11 of the chamber and having formed in said check valve a constricted passage through which the pressure in the section 11 may slowly leak back into the section 10 to normally maintain between said sections, a state of equilibrium of air pressure in both of them. I may use for this check valve a structure, such as indicated at "55" in my Patent No. 2,488,288, dated November 15, 1949.

The diaphragm 43 is preferably of flexible elastic material, such, for example, as vulcanized rubber in which is embedded cord or fabric to impart the necessary strength thereto. It is thus in the form of a plate of fairly heavy rugged construction firmly peripherally bolted to the under side of the chamber 4 by bolts 8 and the pneumatic pressure within the chamber 4 reacts against the upper surface of this diaphragm to carry the weight imposed by the rear portion of the body and chassis frame.

Positioned below the diaphragm 43 is a cradle 44. This may be in the form of a casting or it may be fabricated from structural metal elements. The cradle 44 is provided at its top with a plate 45 which underlies and and is secured to the diaphragm 43 by bolts 46. From the opposite sides of the cradle extend transverse alined trunnions 47 which project through vertical slots 48 formed in vertical hangers 49 secured to and depending from the side members 3 of the chassis frame. The rear end of the cradle carries an axle 50 on which are mounted wheels 51 while to the forward end of the cradle, a transverse axle 52 is secured by means of a heavy stud 53 which passes centrally through the axle. This stud mounts the axle 52 for pivotal movement, so that, when the wheels 54 of the axle 52 pass over uneven ground, the axle may tilt about the axis of the stud 53 and thus minimize twisting strains on the cradle. Adjustable cables 55 act as snubbers and assist in taking up traction and braking strains. Guides 52a are mounted on the cradle back of the axle 52 and normally bear against the axle to protect the stud 53 against bending strains should the wheels 54 at one side of the vehicle strike an obstruction. These guides 52a may be rubber faced if desired. The upper surface of the plate 45 carries rubber bumpers 54a adapted to serve as cushions between this plate and the chassis frame in the event of severe vertical shock.

Mounted on the pivot 57 on the chassis frame forwardly of the cradle is a hanger 56. If, for any reason, it is desired to convert the two axle cradle into one having a single axle, the stud 53 may be removed to release the axle 52 which may then be removed and the hanger 56 may be swung down and secured by the stud 53 for the forward end of the cradle to support it in elevated position, so that the cradle may function with only the back axle 50.

The structure described embodies a diaphragm support although in lieu of such diaphragm, I may employ the cushion of my Patent No. 2,624,594 with upper and lower bearers as therein specified, although the diaphragm is more economical to manufacture.

The structure herein described is particularly intended for use with trailers, for the drawings show no driving means associated with the wheels. However, driving means may be utilized if it is desired to use this arrangement to support the rear end of a truck. The structure of the drawings also embodies many features which commend its use to railway trucks employing flanged wheels, instead of the rubber tires shown.

It will of course be understood that the pneumatic chamber 4 is supplied with compressed air under adequate pressure from any suitable source. Such source may conveniently be in the form of a tank in which air under relatively high compression is supplied from a pump or storage tank. The air may be fed from the storage tank to the respective pneumatic chambers through any suitable controls.

The foregoing detailed description sets forth the invention in its preferred practical form, but the invention is to be understood as fully commensurate with the appended claims.

Having thus fully described the invention, what I claim as new and desire to secure by Letters Patent is:

1. A vehicle comprising: a body having hangers extending downwardly from the opposite sides thereof, a cradle positioned beneath the body and between the hangers and interfitting with the hangers to maintain the cradle in cooperative relation with and beneath the body, a pneumatic suspension chamber interposed between the cradle and the body, wheels mounted on the rear end of the cradle, additional wheels mounted on an axle secured to the forward end of the cradle for pivotal movement on a horizontal axis normal to the axis of the axle, said axle and the forward wheels being removable as a unit, and a hanger secured to the body and adapted to be secured to and support the forward end of the cradle when said axle is removed.

2. A vehicle comprising: a body having hangers extending downwardly from the opposite sides thereof, a cradle positioned beneath the body and between the hangers and interfitting with the hangers to maintain the cradle in cooperative relation with and beneath the body, a pneumatic suspension chamber interposed between the cradle and the body, wheels mounted on one end of the cradle, additional wheels mounted on an axle secured to the other end of the cradle for pivotal movement on a horizontal axis normal to the axis of the axle, said axle and its wheels being removable as a unit, and a hanger secured to the body and adapted to be secured to and support the corresponding end of the cradle when the axle at that end of the cradle is removed.

3. A vehicle according to claim 2, wherein the hangers are provided with trunnions extending into upright slots in the cradle.

4. A vehicle according to claim 2, wherein the cradle carries a longitudinally projecting horizontal stud extending through the axle to mount the latter for pivotal movement.

5. A vehicle according to claim 2, wherein the cradle is provided with guides cooperating with studs on the hangers to maintain said axle normal to its axis of pivotal movement.

6. A vehicle comprising: a chassis frame, a cradle positioned beneath the chassis frame, pneumatic supporting means interposed between the chassis frame and the cradle for supporting the former from the latter, a wheeled axle extending transversely across one end of the cradle, a horizontal stud projecting from the other end of the cradle in the medial plane of the vehicle, a wheeled axle pivoted intermediate its ends on said stud and detachably secured thereto, a hanger mounted on the chassis frame and adapted to be detachably secured to the stud when the axle at that end of said cradle is removed from the stud to permit the weight of the chassis frame to be carried solely by the wheels of the axle at the first mentioned end of said cradle.

7. A vehicle comprising: a chassis frame, a cradle beneath said frame, pneumatic suspension means interposed between the frame and the cradle for supporting the former above the latter, both the front and rear ends of the cradle being provided with wheels, with the wheels at one end of the cradle supported on an axle which is detachably pivoted intermediate its ends to the cradle for pivotal movement on a horizontal axis, a bracket secured to the chassis frame, and means for securing the bracket to the end of the cradle which has the removable axle to support said end of the cradle when the axle at that end of the cradle is removed.

8. A vehicle according to claim 7, wherein said bracket is pivotally mounted on the chassis frame to occupy a position remote from the cradle when detached from the latter.

9. A vehicle according to claim 7, wherein the pivot for securing the axle intermediate its ends to the cradle comprises a stud carried by the cradle and extending through the central portion of the axle.

References Cited in the file of this patent

UNITED STATES PATENTS

| 720,966 | Pulbrook | Feb. 17, 1903 |
|---|---|---|
| 1,488,646 | Nygaard | Apr. 1, 1924 |
| 1,981,449 | Fageol | Nov. 20, 1934 |
| 2,110,214 | Flowers | Mar. 8, 1938 |
| 2,150,604 | Hyatt | Mar. 14, 1939 |
| 2,391,948 | Couse | Jan. 1, 1946 |
| 2,493,004 | Mackie | Jan. 3, 1950 |
| 2,663,569 | Gouirand | Dec. 22, 1953 |